United States Patent
Pheasey et al.

(10) Patent No.: US 9,382,950 B2
(45) Date of Patent: Jul. 5, 2016

(54) SYSTEMS AND METHODS FOR INCREASING THE LIFE OF DOWNHOLE DRIVESHAFT ASSEMBLIES

(71) Applicant: National Oilwell Varco, L.P., Houston, TX (US)

(72) Inventors: Frederick William Pheasey, Edmonton (CA); Jeremy S. Clements, Edmonton (CA)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 14/455,433

(22) Filed: Aug. 8, 2014

(65) Prior Publication Data
US 2015/0051004 A1 Feb. 19, 2015

Related U.S. Application Data

(60) Provisional application No. 61/866,342, filed on Aug. 15, 2013.

(51) Int. Cl.
| | |
|---|---|
| *E21B 7/06* | (2006.01) |
| *F16D 3/18* | (2006.01) |
| *F16D 3/221* | (2006.01) |
| *E21B 4/00* | (2006.01) |
| *E21B 4/02* | (2006.01) |
| *F16D 3/223* | (2011.01) |

(52) U.S. Cl.
CPC ................ *F16D 3/185* (2013.01); *E21B 4/006* (2013.01); *E21B 4/02* (2013.01); *F16D 3/221* (2013.01); *F16D 2003/2232* (2013.01); *F16D 2300/12* (2013.01)

(58) Field of Classification Search
CPC ..... F16D 3/185; F16D 3/221; F16D 2003/12; F16D 2003/2232; E21B 4/02; E21B 4/006

USPC .......... 464/139–141, 152, 153, 155; 175/187, 175/320, 57
See application file for complete search history.

(56) References Cited

U.S. PATENT DOCUMENTS 2,898,749 A * 8/1959 Parkman ............... F16D 3/2052
4,455,896 A * 6/1984 Holmes ................ B25B 13/461

(Continued)

FOREIGN PATENT DOCUMENTS

| CA | 2541339 A1 | 9/2007 | |
| GB | 2 032 055 A * | 4/1980 | ............ 464/153 |

OTHER PUBLICATIONS

International Patent Application No. PCT/US2014/050379 International Search Report and Written Opinion dated Oct. 5, 2015 (10 pages).

(Continued)

*Primary Examiner* — Gregory Binda
(74) *Attorney, Agent, or Firm* — Conley Rose, P.C.

(57) ABSTRACT

A driveshaft assembly including a driveshaft having a first recess proximate a first end, and a second recess proximate a second end. The assembly also includes a first key within the first recess, a second key within the second recess, a first end housing, and a second end housing. The assembly further includes a first thrust bearing seat coaxially disposed within a first receptacle of the first end housing and including a first end, a second end, and a first length L1 measured axially between the second end and the first end, and a second thrust bearing seat coaxially disposed within a second receptacle of the second end housing and including a first end, a second end, and a second length L2 measured axially between the second end and the first end. L1 and L2 are both fixed and L2 is greater than L1.

14 Claims, 9 Drawing Sheets

(56) References Cited

U.S. PATENT DOCUMENTS

| | | |
|---|---|---|
| 4,772,246 A | 9/1988 | Wenzel |
| 5,000,723 A | 3/1991 | Livingstone |
| 5,267,905 A | 12/1993 | Wenzel et al. |
| 7,624,819 B1 | 12/2009 | LeBlanc et al. |
| 2010/0022314 A1* | 1/2010 | Gresse .................. F16D 3/2055 |
| 2011/0005839 A1* | 1/2011 | Marchand ................. E21B 4/02 |

OTHER PUBLICATIONS

Norton Christensen Catalog (1987), p. 5004.

* cited by examiner

US 9,382,950 B2

SYSTEMS AND METHODS FOR INCREASING THE LIFE OF DOWNHOLE DRIVESHAFT ASSEMBLIES

CROSS-REFERENCE TO RELATED APPLICATIONS

This application claims benefit of U.S. provisional patent application Ser. No. 61/866,342 filed Aug. 15, 2013, and entitled "Systems and Method for Increasing the Life of Downhole Driveshaft Assemblies," which is hereby incorporated herein by reference in its entirety.

STATEMENT REGARDING FEDERALLY SPONSORED RESEARCH OR DEVELOPMENT

Not applicable.

BACKGROUND

The invention relates generally to downhole driveshafts. More particularly, the invention relates to driveshafts employed in downhole motors used in drilling operations.

In drilling a borehole into an earthen formation, such as for the recovery of hydrocarbons or minerals from a subsurface formation, it is conventional practice to connect a drill bit onto the lower end of a drillstring formed from a plurality of pipe joints connected together end-to-end, and then rotate the drillstring so that the drill bit progresses downward into the earth to create a borehole along a predetermined trajectory. In directional drilling applications, specialized drillstring components and "bottom hole assemblies" (BHA) are used to induce, monitor, and control deviations in the path of the drill bit, so as to produce a borehole of desired non-vertical configuration. In addition, a typical BHA also includes a downhole or mud motor incorporated therein which further includes a power section, a bearing assembly disposed downhole of the power section, and a driveshaft assembly extending axially between the power section and bearing assembly. The power section is typically a progressive cavity or positive displacement motor (PD motor) that includes a rotor rotatably disposed within a stator.

In drilling operations, drilling fluid (e.g., drilling mud) is circulated under pressure through the drillstring and back up to the surface; however, en route to the drill bit, the pressurized drilling fluid flows through the power section, between the rotor and stator, to produce eccentric, precessional motion of the rotor with respect to the longitudinal axis of the stator, which thus generates rotational torque that is transferred through the driveshaft and bearing assemblies to rotate the drill bit about the central axis of the drillstring. During this process, the driveshaft assembly converts the eccentric motion of the rotor into rotary motion (i.e., concentric rotation) to rotate the bearing assembly and drill bit during drilling operations. For conventional driveshaft assemblies, such universal joints tend to wear or fail relatively quickly during operation. In particular, many conventional driveshafts transfer torque between various contact surfaces through either point or line contact(s), which disperse a large amount of force over a relatively small surface area, thereby tending to accelerate wear at such contact surfaces.

BRIEF SUMMARY OF THE DISCLOSURE

Some embodiments are directed to a driveshaft assembly for a downhole motor. In an embodiment, the driveshaft assembly includes a driveshaft having a central longitudinal axis, a first end, a second end opposite the first end, a first recess proximate the first end, and a second recess proximate the second end. In addition, the driveshaft assembly includes a first drive key configured to be at least partially disposed within the first recess and a second drive key configured to be at least partially disposed within the second recess. Further, the driveshaft assembly includes a first end housing having a central axis, a first end, a second end opposite the first end, and a first receptacle extending axially from an open end to a closed end, wherein the open end is proximate the first end of the first end housing and wherein the first receptacle includes a first pocket having an inner wall. Still further, the driveshaft assembly includes a second end housing having a central axis, a first end, a second end opposite the first end, and a second receptacle extending axially from an open end to a closed end, wherein the open end is proximate the first end of the second end housing and wherein the second receptacle includes a second pocket having an inner wall. Also, the driveshaft assembly includes a central point disposed along the central longitudinal axis of the driveshaft and substantially equidistant from the closed end of the first receptacle and the closed end of the second receptacle along the central longitudinal axis of the driveshaft. The driveshaft assembly has a first configuration, wherein the first end of the driveshaft is disposed within the first receptacle such that the first drive key engages the inner wall of the first pocket at a first contact point that is spaced from the central point at a distance H1 along the central longitudinal axis of the driveshaft, and wherein the second end of the driveshaft is disposed within the second receptacle such that the second drive key engages the inner wall of the second pocket at a second contact point that is spaced from the central point at a distance H2 along the central longitudinal axis of the driveshaft. H1 is greater than H2.

Other embodiments are directed to a driveshaft assembly. In an embodiment, the driveshaft assembly includes a driveshaft having a central longitudinal axis, a first end, a second end opposite the first end, and a first recess proximate the first end. In addition, the driveshaft assembly includes a first drive key configured to be partially received within the first recess. Further, the driveshaft assembly includes a first end housing having a central axis, a first end, a second end opposite the first end, and a first receptacle extending axially from the first end, wherein the first receptacle includes a first pocket having an inner wall. Still further, the driveshaft assembly includes a first pivot point disposed along the central longitudinal axis of the driveshaft and proximate the first end of the driveshaft wherein the driveshaft is configured to pivot omni-directionally about the first pivot point relative to the first end housing. The first drive key has a center that lies within a first plane that extends radially to the central longitudinal axis of the driveshaft and is axially spaced from the first pivot point when the first drive key is partially received within the first recess. The first end of the driveshaft is received within the first receptacle such that the first drive key is partially received within the first pocket.

Other embodiments are directed to a driveshaft assembly. In an embodiment, the driveshaft assembly includes a driveshaft having a central longitudinal axis, a first end, a second end opposite the first end, a first recess proximate the first end, and a second recess proximate the second end. In addition, the driveshaft assembly includes a first drive key configured to be at least partially disposed within the first recess and a second drive key configured to be at least partially disposed within the second recess. Further, the driveshaft assembly includes a first end housing having a central axis, a first end, a second end opposite the first end, and a first receptacle extending axially from the first end, wherein the first receptacle includes a first pocket having an inner wall, and a second end housing having a central axis, a first end, a second end opposite the first end, and a second receptacle extending axially from the first end, wherein the second receptacle includes a second pocket having an inner wall. Still further, the driveshaft assembly includes a first thrust bearing seat disposed within the first receptacle and including a central axis that is substantially aligned with the central axis of the first end housing, a first end, a second end opposite the first end, a first concave, spherical bearing surface disposed on the first end, and a first central length L1 measured axially along the central axis of the first thrust bearing seat between the second end and the first concave, spherical bearing surface. Also, the driveshaft assembly includes a second thrust bearing seat disposed within the second receptacle and including a central axis that is substantially aligned with the central axis of the second end housing, a first end, a second end opposite the first end, a second concave, spherical bearing surface disposed on the first end, and a second central length L2 measured axially along the central axis of the second thrust bearing seat between the second end and the second concave, spherical bearing surface. L2 is greater than L1.

Still other embodiments are directed to a method for drilling a borehole into an earthen formation. In an embodiment, the method includes (a) contacting a first end housing at a first axial position with a first drive key, wherein the first end housing has a central axis, a first end, a second end opposite the first end, and a first receptacle extending axially from the first end, and wherein the first drive key is disposed within the first receptacle in the first end housing and radially disposed between the first end housing and a driveshaft. In addition, the method includes (b) transferring torque between the first end housing and the driveshaft via the first drive key during (a). Further, the method includes (c) contacting the first end housing at a second axial position with the first drive key or a second drive key after (b), wherein the second axial position is axially spaced from the first axial position.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the disclosed embodiments, reference will now be made to the accompanying drawings in which.

DETAILED DESCRIPTION OF THE PREFERRED EMBODIMENTS

Figure 1:
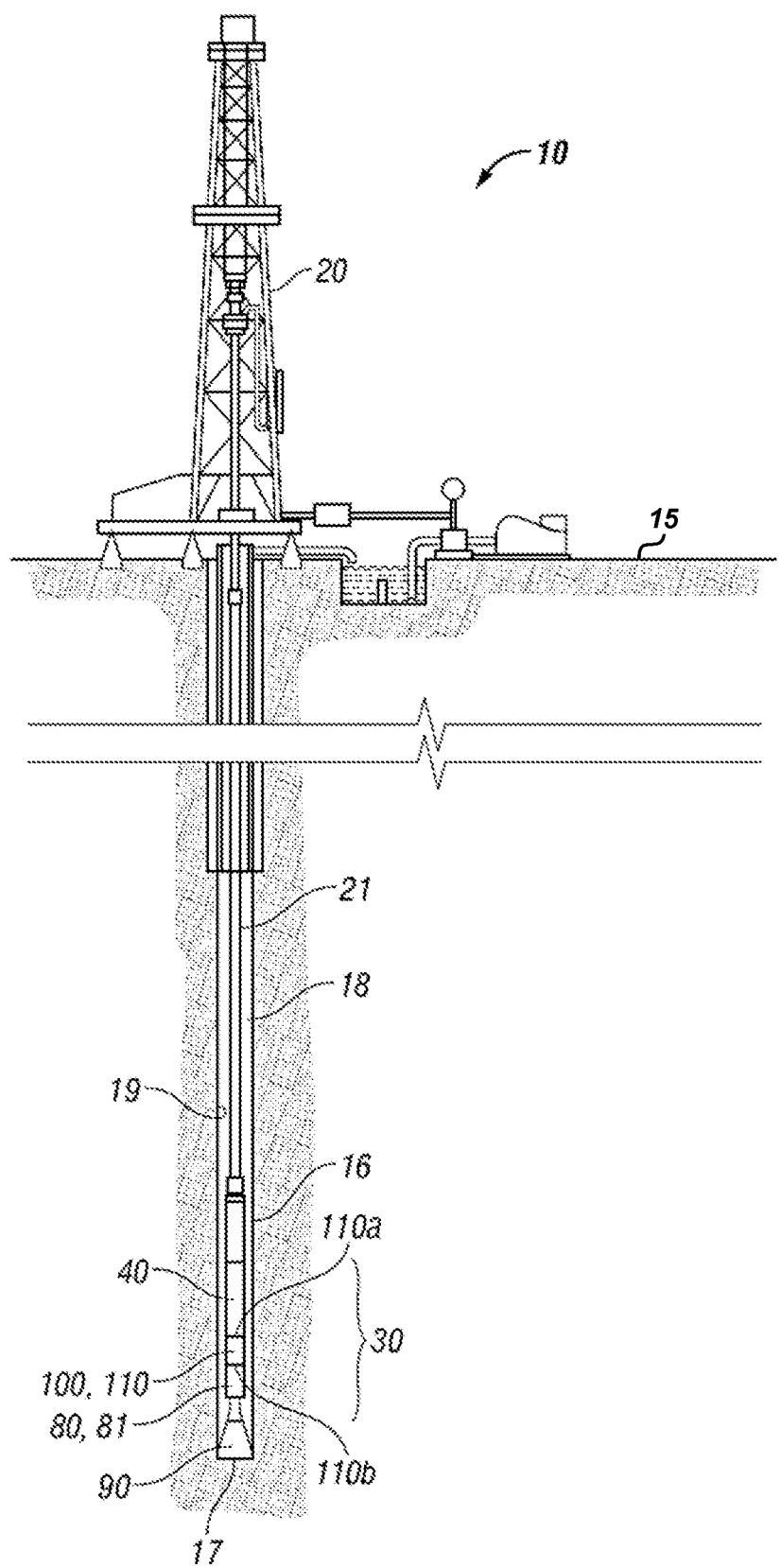
FIG. 1 is a schematic side view of an embodiment of a system for drilling a borehole in an earthen formation in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

As previously described, the universal joints of conventional driveshaft assemblies tend to wear (e.g., plastically deform) or fail relatively quickly during operation due to the point or line contact(s) between the various contact surfaces disposed therein. As the torque load between the contact surfaces increases (e.g., due to an increase in the output torque from the power section), the rate of wear also increases. As a result, drilling operations must be ceased at relatively frequent intervals to replace worn and/or failed components (e.g., end housings) within the joint assemblies coupled to the driveshaft, which thereby increases the total costs of operating downhole motors. Thus, embodiments disclosed herein include driveshaft assemblies incorporating universal joints that allow for multiple engagement arrangements or configurations therebetween to extend the useful life of components of the driveshaft assemblies and thereby decrease the overall costs of operation of downhole motors.

Referring now to FIG. 1, a system 10 for drilling a borehole 16 in an earthen formation is shown. In this embodiment, system 10 includes a drilling rig 20 disposed at the surface 15, a drill string 21 extending from rig 20 into borehole 16, a downhole motor 30, and a drill bit 90. Motor 30 forms a part of the bottomhole assembly ("BHA") and is disposed between the lower end of the drill string 21 and drill bit 90. Moving downward along the BHA towards bit 90, motor 30 includes a hydraulic drive or power section 40, a driveshaft assembly 100 coupled to power section 40, and a bearing assembly 80 coupled to driveshaft assembly 100. Bit 90 is coupled to the lower end of bearing assembly 80.

The hydraulic drive section 40 converts pressure exerted by drilling fluid pumped down drill string 21 into rotational torque that is transferred through driveshaft assembly 100 and bearing assembly 80 to drill bit 90. With force or weight applied to the drill bit 90, also referred to as weight-on-bit ("WOB"), the rotating drill bit 90 engages the earthen formation and proceeds to form borehole 16 along a predetermined path toward a target zone. The drilling fluid or mud pumped down the drill string 21 and through motor 30 passes out of the face of drill bit 90 and back up the annulus 18 formed between drill string 21 and the sidewall 19 of borehole 16. The drilling fluid cools the bit 90, and flushes the cuttings away from the face of bit 90 and carries the cuttings to the surface.

Figure 2:
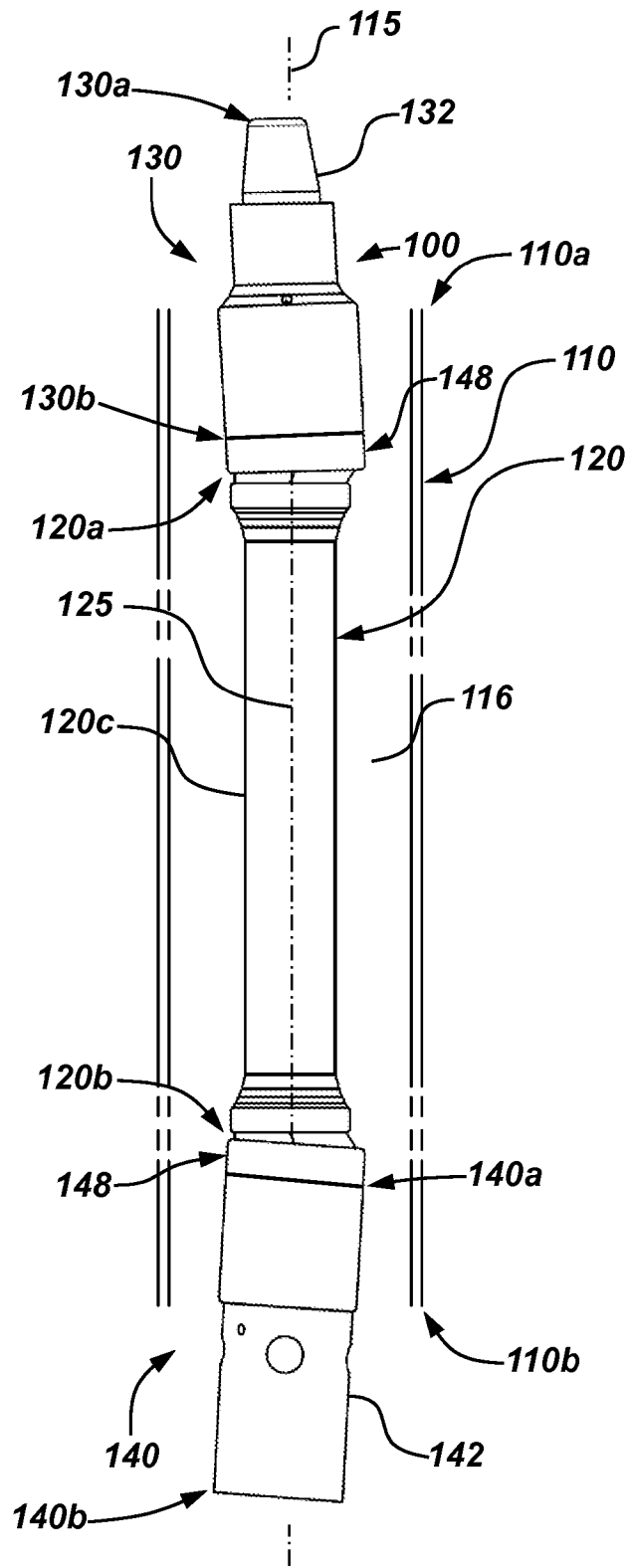
FIG. 2 is an enlarged side view of an embodiment of the driveshaft assembly of FIG. 1.

Referring now to FIG. 2, in this embodiment driveshaft assembly 100 is rotatably disposed within an outer housing 110 and includes a driveshaft 120, a first or upper end housing 130 coupled to the driveshaft 120, and a second or lower end housing 140 coupled to driveshaft 120. In addition, assembly 100 includes an end cap 148 threadably engaged to each of the end housings 130, 140. In this embodiment, outer housing 110 is an elongate cylindrical tubular member having a central or longitudinal axis 115, a first or upper end 110a, and a second or lower end 110b opposite upper end 110a. As is best shown in FIG. 1, in this embodiment, housing 110 is coaxially aligned with hydraulic drive section 40 and bearing assembly 80. In addition, upper end 110a of outer housing 110 is coupled to drive section 40 and lower end 110b of outer housing 110 is coupled to bearing assembly 80. In some embodiments upper end 110a of outer housing 110 is threadably engaged with drive section 40 and lower end 110b is threadably engaged with bearing assembly 80; however, any suitable connection or engagement devices or methods may be used.

Referring again to FIG. 2, driveshaft 120 has a central or longitudinal axis 125, a first end 120a, a second end 120b opposite end 120a, and a generally cylindrical radially outer surface 120c extending axially between ends 120a, 120b. In this embodiment, driveshaft 120 is enlarged proximate the ends 120a, 120b (i.e., the radius of driveshaft 120 generally increases towards ends 120a, 120b). As will be described in more detail below, axis 125 of driveshaft 120 is not coaxially aligned with axis 115 of outer housing 110. An annular space 116 is formed between outer housing 110 and driveshaft 120.

During drilling operations, drilling fluid is pumped down drill string 21 and through downhole motor 30 to drill bit 90. Within driveshaft assembly 100, drilling fluid flows through annular space 116 from upper end 110a to lower end 110b en route to bearing assembly 80 and drill bit 90.

Upper end housing 130 has a first or upper end 130a, and a second or lower end 130b opposite end 130a. In this embodiment, upper end housing 130 is provided with a male pin-end connector 132 at the upper end 130a that threadably connects upper end housing 130 to the output shaft of hydraulic drive section 40.

Lower end housing 140 has a first or upper end 140a, and a second or lower end 140b opposite the upper end 140a. In this embodiment, lower end housing 140 is provided with a female box end connector 142 at the lower end 140b that threadably connects lower end housing 140 to the mandrel of bearing assembly 80.

As will be described in more detail below, assembly 100 is configured to be placed in multiple configurations to lengthen or increase the useful life of each of the components disposed therein (e.g., the end housings 130, 140). In particular, when assembly 100 is switched between configurations, the points of contact between the various contact surfaces within assembly 100 shift such that any wear which has occurred while assembly 100 was operating in a first configuration does not affect the engagement between the contact surfaces when assembly 100 is placed in a second configuration. Multiple embodiments of assembly 100 are disclosed which enable the performance and function described above (e.g., multiple configurations for increased service life). It should be appreciated that each of these embodiments may be utilized within system 10 while still complying with the principles described herein. Each of these embodiments will now be described in more detail below.

Figure 3:
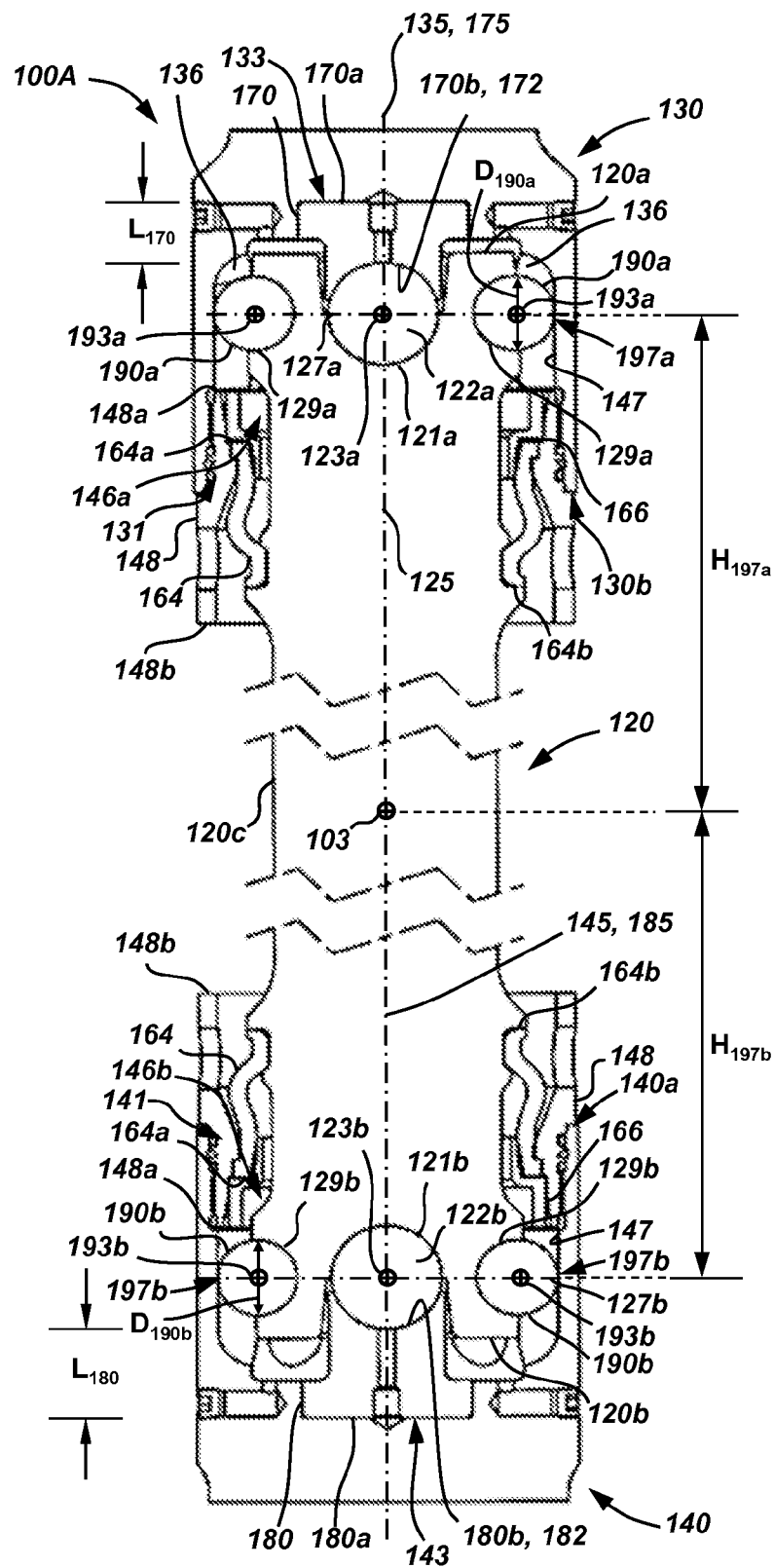
FIG. 3 is a side cross-sectional view of an embodiment of the driveshaft assembly of FIG. 1 in a first configuration.
Figure 4:
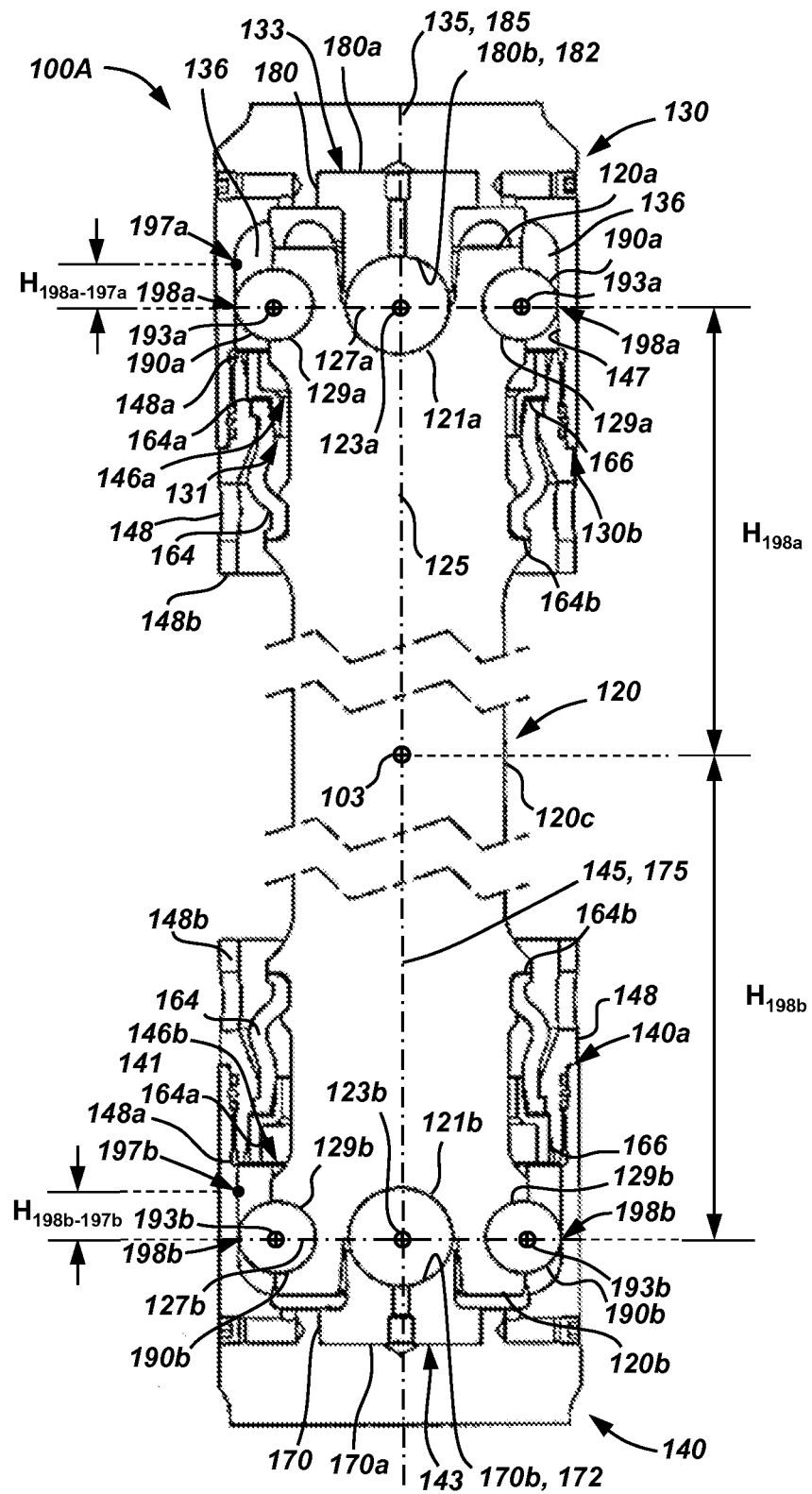
FIG. 4 is a side cross-sectional view of the driveshaft assembly of FIG. 3 in a second configuration.

Referring now to FIGS. 3 and 4, an embodiment of a driveshaft assembly 100A is shown. Assembly 100A includes driveshaft 120, upper end housing 130, and lower end housing 140 (for convenience, only a portion of housings 130, 140 are shown in FIGS. 3 and 4). In this embodiment, driveshaft 120 includes a first plurality of spherical recesses 129a extending circumferentially about driveshaft 120 and radially inward from surface 120c proximate the upper end 120a, and a second plurality of spherical recesses 129b extending circumferentially about driveshaft 120 and radially inward from surface 120c proximate the lower end 120b. In addition, driveshaft includes a first cavity 121a extending axially from end 120a and a second cavity 121b extending axially from the second end 120b.

A first plurality of spherical drive keys 190a each having a center 193a and a diameter $D_{190a}$ is disposed on driveshaft 120 proximate first end 120a such that each one of the first plurality of drive keys 190a is partially disposed or seated within one of the first plurality of recesses 129a. In addition, a second plurality of spherical drive keys 190b, each having a center 193b and a diameter $D_{190b}$ is disposed on driveshaft 120 proximate second end 120b such that each one of the second plurality of drive keys 190b is partially disposed or seated within one of the second plurality of recesses 129b. Further, a first thrust ball 122a having a center 123a is seated within the first cavity 121a, and a second thrust ball 122b having a center 123b is seated within the second cavity 121b. As is best shown in FIG. 3, in this embodiment, the centers 193a of the drive keys 190a are disposed within a first radial plane 127a that extends perpendicularly through the central axis 125 of driveshaft 120 and the center 123a of the first thrust ball 122a. Further, the centers 193b of the drive keys 190b are disposed within a second radial plane 127b extending perpendicularly through the central axis 125 of driveshaft 120 and center 123b of the second thrust ball 122b.

Figure 5:
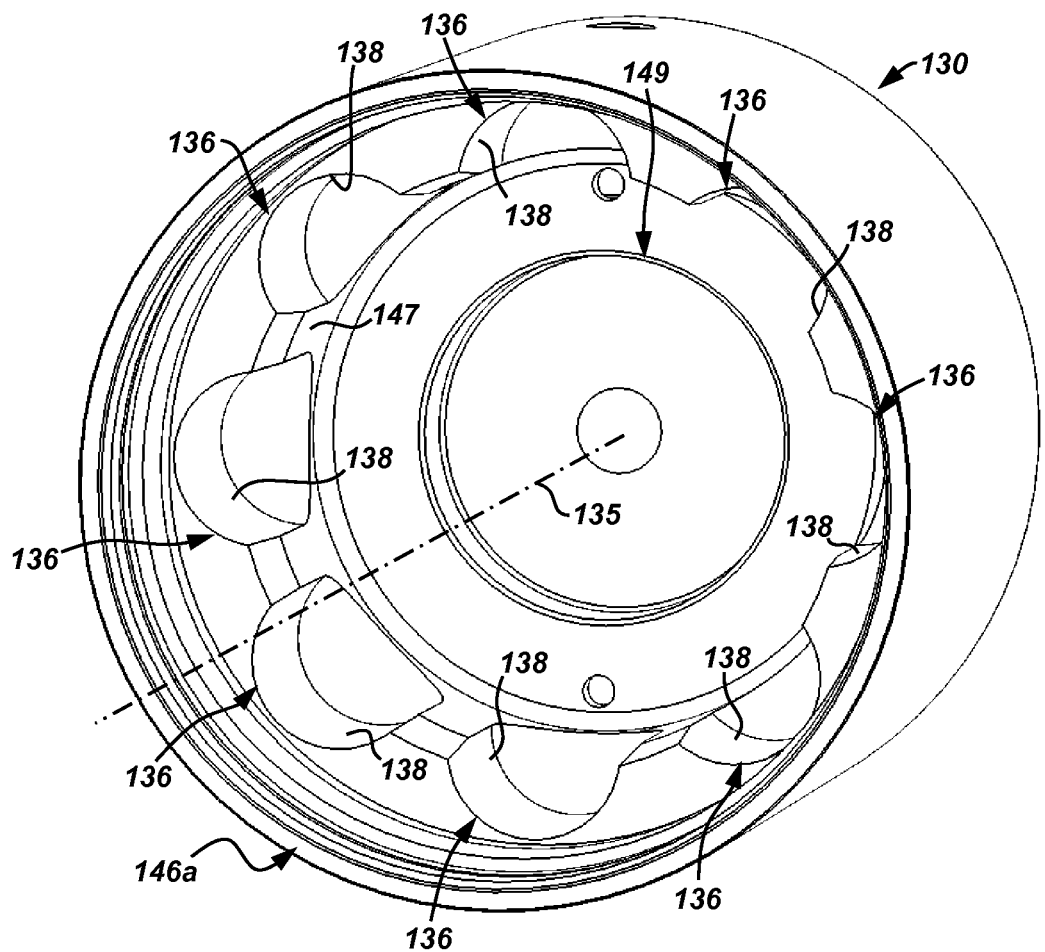
FIG. 5 is a perspective view of one of the socket sections of one of the end housings of the driveshaft assembly of FIG. 3.

Housing 130 has a central or longitudinal axis 135 and includes a receptacle 146a extending axially from an open end 131 that is proximate the lower end 130b of end housing 130 to a closed end 133 and including a radially inner surface 147 extending between the ends 131, 133. Referring briefly to FIG. 5, receptacle 146a includes a first plurality of cylindrical pockets or recesses 136 extending radially outward from surface 147. Each pocket 136 includes a generally cylindrical inner wall 138 that, as will be explained in more detail below, is configured to engage with one of the first plurality of spherical drive keys 190a or one of the second plurality of spherical drive keys 190b during operation. In this embodiment, the curvature of the inner wall 138 of each pocket 136 generally matches or corresponds to the outer curvature of each of the keys 190a, 190b such that engagement between the keys 190a, 190b and the inner walls 138 results in line contact however, other contact arrangements are possible (e.g., point contact). In addition, receptacle 146a includes an axially extending counterbore 149 at the closed end 133 that is coaxially aligned with axis 135.

Referring back now to FIGS. 3 and 4, end housing 140 has a central or longitudinal axis 145 and a receptacle 146b extending axially from an open end 141 that is proximate the upper end 140a of end housing 140 to a closed end 143. In this embodiment receptacle 146b is substantially the same as the receptacle 146a, previously described. Thus, like numerals are used to refer to like components and the description of receptacle 146a may be applied to fully describe receptacle 146b.

In this embodiment, as previously described an end cap 148 is threadably engaged within each of the receptacles 146a, 146b of housings 130, 140, respectively. Each end cap 148 includes a first or outer end 148a, a second or inner end 148b opposite the outer end 148a. In addition, in this embodiment, an L-shaped compression ring 166 is also disposed within each of the receptacles 146a, 146b of end housings 130, 140, respectively such that each ring 166 is threadably engaged to one of the end caps 148 at the outer end 148a. Further, in this embodiment, a flexible closure boot 164 is provided within each receptacle 146a, 146b to prevent drilling mud from flowing into either of the receptacles 146a, 146b during drilling operations. In particular, each boot 164 includes a first or outer end 164a, and a second or inner end 164b opposite the outer end 164a. Outer end 164a of each boot 164 is radially compressed and is therefore secured between ring 166 and end cap 148 of each receptacle 146a, 146b while the inner end 164b of each boot 164 sealingly engages outer surface 120c of driveshaft 120. Thus, each boot 164 extends radially between driveshaft 120 and one of the end housings 130, 140. Still further, in this embodiment, assembly 100A further includes a central point 103 that is disposed along the axis 125 of driveshaft 120 and is substantially equidistant from the closed end 133 of the receptacle 146a and the closed end 143 of the receptacle 143b.

Referring still to FIGS. 3 and 4, in this embodiment, assembly 100A further includes a first thrust bearing seat 170 and a second thrust bearing seat 180. First thrust bearing seat 170 has a central or longitudinal axis 175 that is aligned with one of the axes 135, 145 of end housings 130, 140, respectively, during operation and includes a first or outer end 170a, a second or inner end 170b opposite the outer end 170a, and a concave spherical bearing surface 172 disposed at the inner end 170b. In addition as shown in FIG. 3, seat 170 includes a central length $L_{170}$ measured axially along axis 175 between the ends 170a, 170b (i.e., $L_{170}$ is measured along axis 175 between the end 170a and surface 172). Similarly, second thrust bearing seat 180 has a central or longitudinal axis 185 that is aligned with one of the axes 135, 145 of end housings 130, 140, respectively, during operation and includes a first or outer end 180a and a second or inner end 180b opposite the outer end 180a. In addition as shown in FIG. 3, seat 180 includes a central length $L_{180}$ measured axially along axis 185 between the ends 180a, 180b (i.e., $L_{180}$ is measured along axis 185 between the end 180a and surface 182). In this embodiment, the length $L_{180}$ is larger than the length $L_{170}$. During operation, each seat 170, 180 is disposed within one of the receptacles 146a, 146b such that the outer ends 170a, 180a are seated within one of the counter bores 149 and each of the surfaces 172, 182 engage with one of the thrust balls 122a, 122b, previously described.

Referring specifically to FIG. 3, during drilling operations, assembly 100A may be placed in a first configuration. In particular, as shown in FIG. 3, when assembly 100A is in the first configuration, the first thrust bearing seat 170 and first end 120a of driveshaft 120 are each received within the receptacle 146a of end housing 130 such that the first thrust ball 122a engages the concave spherical bearing surface 172 of seat 170. In addition, the second thrust bearing seat 180 and second end 120b of driveshaft 120 are each received within the receptacle 146b of end housing 140 such that the second thrust ball 122b engages the concave spherical bearing surface 182 of seat 180.

Also, when assembly 100A is in the first configuration, each of the first plurality of spherical drive keys 190a are received within one of the pockets 136 of receptacle 146a, such that each key 190a engages one of the inner walls 138 at a contact line 197a, wherein each of the contact lines 197a lies within the plane 127a and is axially spaced from the central point 103 of assembly 100A by a distance $H_{197}a$. Similarly, when assembly 100A is in the first configuration, each of the second plurality of spherical drive keys 190b are received within one of the pockets 136 of receptacle 146b, such that each key 190b engages one of the inner walls 138 at a contact line 197b, wherein each of the contact lines 197b lies within the plane 127b and is axially spaced from the central point 103 of assembly 100A by a distance $H_{197b}$. As is shown in FIG. 3, because the length $L_{180}$ is greater than the length $L_{170}$ as previously described, the distance $H_{197a}$ is greater than the distance $H_{197b}$.

During drilling operations, rotational torque generated in power section 40 (see FIG. 1) is transferred from end housing 130 to driveshaft 120 through the engagement between keys 190a and pockets 136 within receptacle 146a at the contact lines 197a and is further transferred from driveshaft 120 to end housing 140 through the engagement between keys 190b and pockets 136 within receptacle 146b at the contact lines 197b. Thus, during operation the housing 130, driveshaft 120, and housing 140 each rotate about their respective axes 135, 125, 145 (which may or may not be aligned). In addition, as housing 130, driveshaft 120, and housing 140 each rotate in the manner described above, the driveshaft 120 is free to pivot omni-directionally about both the center 123a of the first thrust ball 122a relative to the end housing 130 and the center 123b of the second thrust ball 122b relative to the end housing 140, such that the eccentric rotational output of the power section 40 is accommodated.

Referring specifically now to FIG. 4, as driveshaft 120 rotates and pivots in the manner described above, the engagement between each of the drive keys 190a, 190b and the inner walls 138 of the pockets 136 of the receptacles 146a, 146b, respectively, results in wear and deformation of the inner walls 138 at lines 197a, 197b. In addition, it should be appreciated that as driveshaft 120 rotates and pivots in the manner described above, each of the keys 190a, 190b and thus the lines 197a, 197b oscillate axially, along the walls 138 (e.g., due to the pivoting of driveshaft 120 about the centers 123a, 123b, previously described) such that the wear and deformation of the walls 138 is concentrated not only along each of the lines 197a, 197b, but also in the areas that are axially proximate lines 197a, 197b. Over time, the wear and deformation described above eventually diminishes the torque transfer capabilities of assembly 100A. Thus, in at least some embodiments, assembly 100A may be transitioned to a second configuration by switching the relative positions of the first and second thrust bearing seats 170, 180 within the receptacles 146a, 146b. In particular, when assembly 100A is in the second configuration, the first thrust bearing seat 170 is disposed within the receptacle 146b of the housing 140 such that the spherical concave surface 172 engages with the second thrust ball 122b, and the second thrust bearing seat 180 is disposed within the receptacle 146a of the housing 130 such that the spherical concave bearing surface 182 engages with the first thrust ball 122a.

Because the length $L_{180}$ of seat 180 is greater than the length $L_{170}$ of seat 170, when assembly 100A is placed in the second configuration as shown in FIG. 4, each of the keys 190a, 190b engage a substantially unworn surface on walls 138 within each of the pockets 136 that is axially spaced from the contact lines 197a, 197b, respectively. In particular, when assembly 100A is placed in the second configuration, each of the first plurality of spherical drive keys 190a shift axially within receptacle 146a to engage the inner walls 138 of the pockets 136 at a contact line 198a, wherein each of the contact lines 198a is axially spaced from the central point 103 of assembly 100A by a distance $H_{198a}$ that is less than the distance $H_{197a}$, previously described. Therefore, the contact lines 198a are axially spaced from the contact lines 197a by an axial distance $H_{198a-197a}$. In addition, when assembly 100A is placed in the second configuration, each of the second plurality of spherical drive keys 190b shift axially within receptacle 146b to engage the inner walls 138 of the pockets 136 at a contact line 198b, wherein each of the contact lines 198a is axially spaced from the central point 103 of assembly 100A by a distance $H_{198b}$ that is greater than the distance $H_{197b}$, previously described. Therefore, the contact lines 198b are axially spaced from the contact lines 197b, by an axial distance $H_{198b-197b}$. In some embodiments, the axial distances $H_{198a-197a}$, $H_{198b-197b}$ are each the same as the relative difference between the lengths $L_{170}$, $L_{180}$ of seats 170, 180, respectively. To ensure that each of the drive keys 190a, 190b engage a substantially unworn or un-deformed surface within the pockets 136 when assembly 100A is placed in the second configuration, the axial distances $H_{198a-197a}$, $H_{198b-197b}$ are each preferably at least 30% of the axial length (e.g., diameter $D_{190a}$, $D_{190b}$ for spherical drive keys 190a, 190b, respectively) of the drive keys 190a, 190b, respectively, and are more preferably at least 50% of the axial length (e.g., diameters $D_{190a}$, $D_{190b}$) of the drive keys 190a, 190b, respectively. Further, in some embodiments, the distance $H_{197a}$ is substantially equal to the distance $H_{198b}$ and the distance $H_{197b}$ is substantially equal to the distance $H_{198a}$. Thereafter, normal operations may be resumed with each of the keys 190a, 190b engaging with a substantially unworn surface (e.g., on walls 138) within one of the pockets 136 of receptacles 146a, 146b, respectively. Thus, by transitioning the assembly 100A between the first and second configurations as previously described, the contact or engagement positions (e.g., lines 197a, 197b, 198a, 198b) of each of the keys 190a, 190b are effectively shifted within the receptacles 146a, 146b to allow each of the keys 190a, 190b to once again engage with an unworn surface therein, thereby increasing the usable life of assembly 100A during drilling operations.

Figure 6:
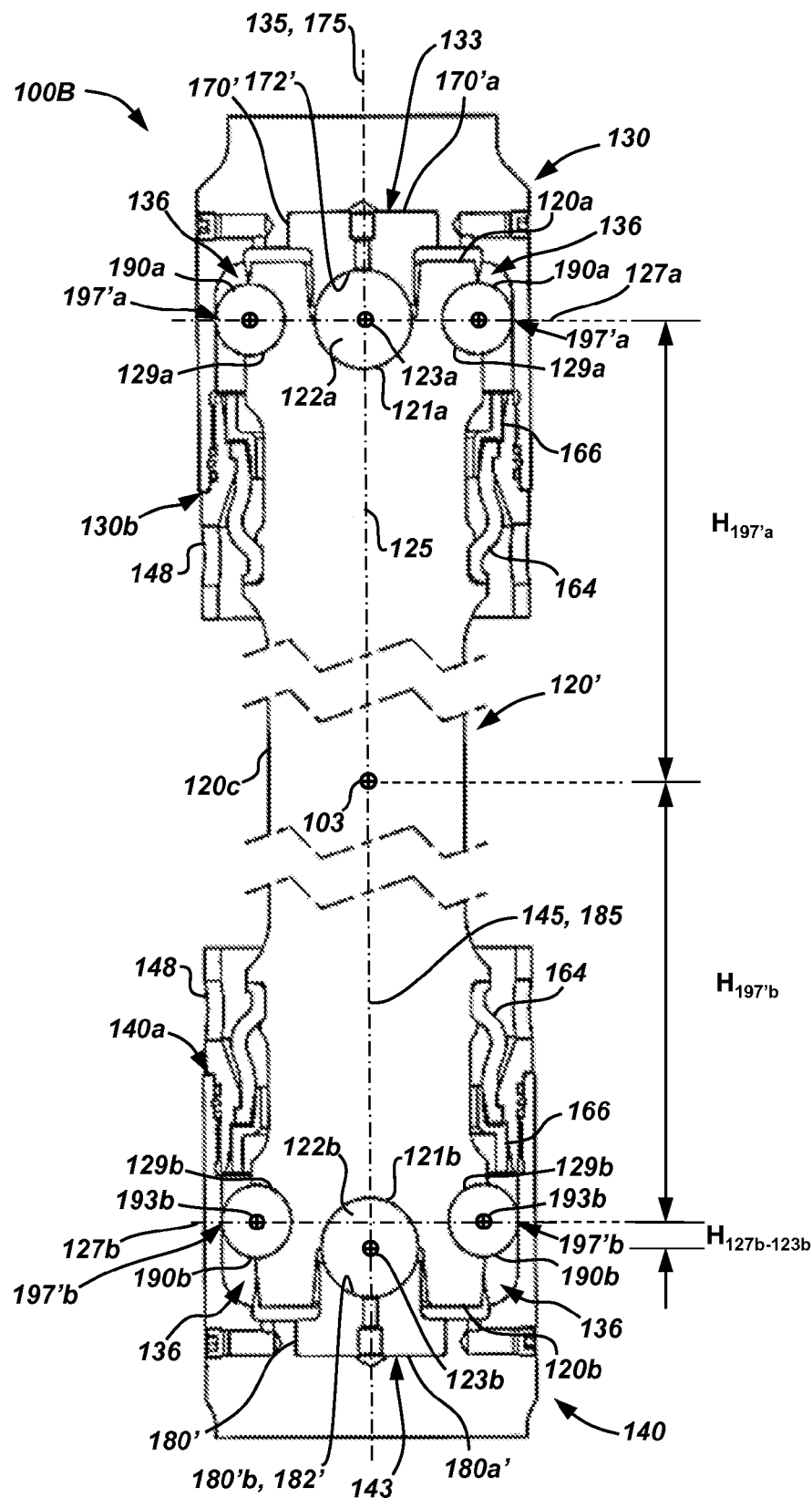
FIG. 6 is a side cross-sectional view of an embodiment of the driveshaft assembly of FIG. 1 in a first configuration.
Figure 7:
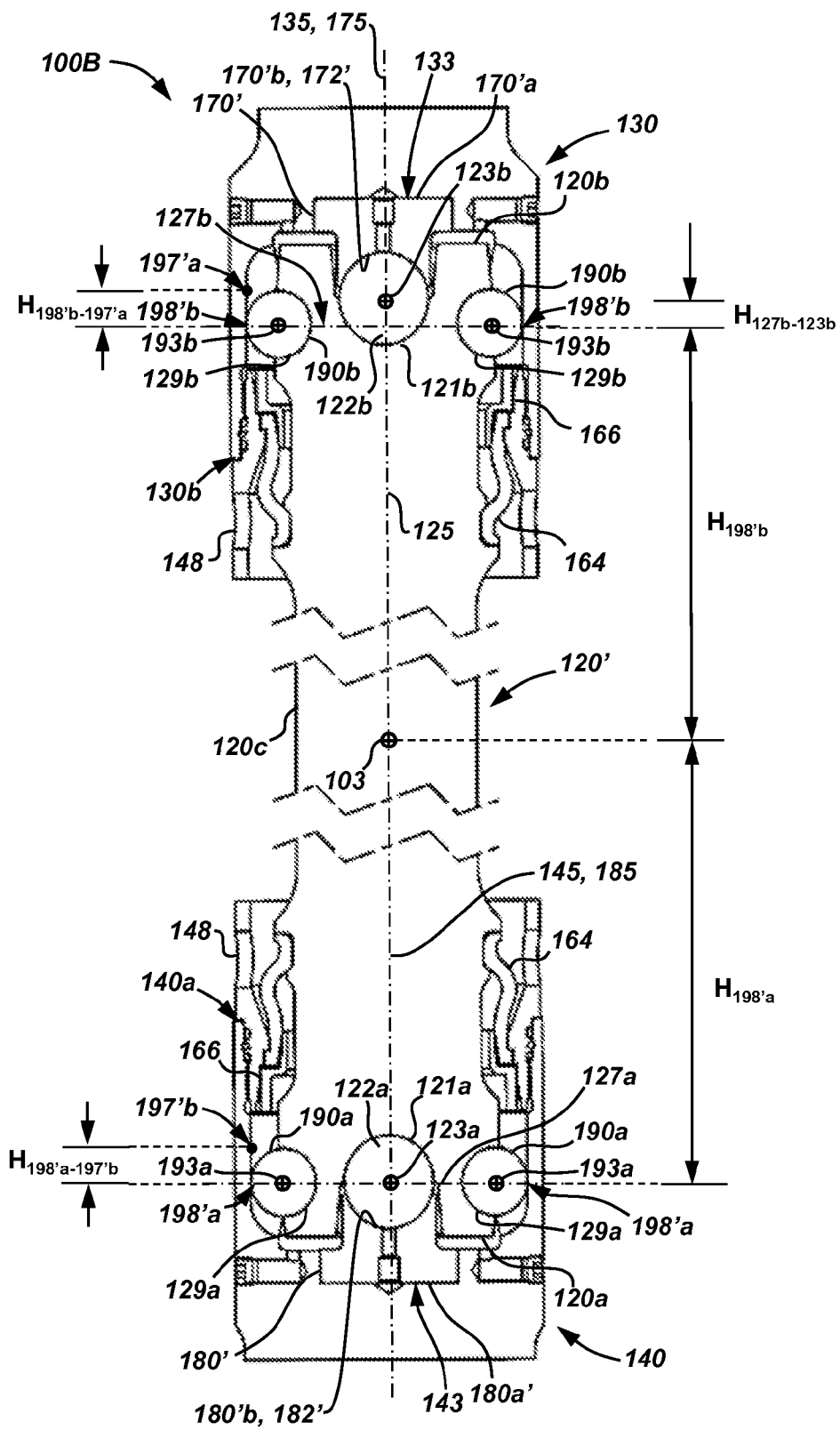
FIG. 7 is a side cross-sectional view of the driveshaft assembly of FIG. 6 in a second configuration.

Referring now to FIGS. 6 and 7, an embodiment of a driveshaft assembly 100B is shown. Assembly 100B includes many of the same features as assembly 100A, previously described. As a result, like components and features are referred to with like reference numerals, and the discussion below will concentrate on the differences between the assemblies 100A, 100B and/or specific components disposed therein. In particular, assembly 100B includes a driveshaft 120' that shares many of the same components and features as the driveshaft 120, previously described, except that the axial position of the recesses 129b is shifted relative to the second end 120b such that when the drive keys 190b are disposed within the recesses 129b, the second radial plane 127b aligning the centers 193b of keys 190b is axially spaced from the center 123b of the second thrust ball 122b by an axial distance $H_{127b-123b}$ (i.e., the centers 193b of the keys 193b are axially spaced from the center 123b of ball 122b by the distance $H_{127b-123b}$). However, it should be appreciated that the first radial plane 127a extends perpendicularly with respect to the axis 125 through the centers 193a of keys 190a and the center 123a of thrust ball 122a in the same manner as previously described for assembly 100A. In addition, assembly 100B includes a first thrust bearing seat 170' and a second thrust bearing seat 180' that are substantially the same as the first and second bearing seats 170, 180, respectively, except that the central length $L_{170}$ of the seat 170' is substantially equal to the central length $L_{180}$ of the seat 180'.

Referring specifically to FIG. 6, during drilling operations, assembly 100B may be placed in a first configuration wherein the end 120a of driveshaft 120' is received within the receptacle 146a of end housing 130 and the end 120b of driveshaft 120' is received within the receptacle 146b of end housing 140. In addition, when assembly 100B is placed within the first configuration, each of the first plurality of spherical drive keys 190a are received within one of the pockets 136 of receptacle 146a, such that each key 190a engages one of the inner walls 138 at a contact line 197'a, wherein each of the contact lines 197'a lies within the plane 127a and is axially spaced from the central point 103 of assembly 100B at a distance $H_{197'a}$. Similarly, when assembly 100B is in the first configuration, each of the second plurality of spherical drive keys 190b are received within one of the pockets 136 of receptacle 146b, such that each key 190b engages one of the inner walls 138 at a contact line 197'b, wherein each of the contact lines 197'b lies within the plane 127b and is axially spaced from the central point 103 of assembly 100B at a distance $H_{197'b}$. As is shown in FIG. 6, because the second radial plane 127b is axially spaced from the center 123b of the second thrust ball 122b by an axial distance $H_{127b-123b}$ and the first radial plane 127a passes through the center 123a of ball 122a, the distance $H_{197'a}$ is greater than the distance $H_{197'b}$.

During operations, the housing 130, driveshaft 120', and housing 140 each rotate about their respective axes 135, 125, 145, while the driveshaft 120' simultaneously pivots about the centers 123a, 123b of the thrust balls 122a, 122b, in the manner previously described above for assembly 100A. During this process, the inner walls 138 of the pockets 136 of receptacles 146a, 146b wear and deform due to the contact with the keys 190a, 190b, respectively at and axially proximate lines 197'a, 197'b, as previously described, such that the torque transfer capabilities of assembly 100B are diminished. Thus, referring specifically to FIG. 7, in at least some embodiments, assembly 100A may be transitioned to a second configuration by inverting the driveshaft 120' relative to the housings 130, 140. In particular, in the second configuration, the first end 120a of driveshaft 120' is received within the receptacle 146b of housing 140 and the second end 120b of driveshaft 120' is received within the receptacle 146a of housing 130.

Because the first radial pane 127a passes through the center 123a of the first thrust ball 122a and the second radial plane 127b is axially spaced from the center 123b of the second thrust ball 122b by axial distance $H_{127b-123b}$, when assembly 100B is placed in the second configuration as shown in FIG. 7, each of the keys 190a, 190b engage a substantially unworn surface along walls 138 within each of the pockets 136 that is axially spaced from lines 197'b, 197'a, respectively. In particular, when assembly 100B is placed in the second configuration, each of the first plurality of spherical drive keys 190a engage the inner walls 138 of the pockets 136 within receptacle 146b at a contact line 198'a, wherein each of the contact lines 198'a is axially spaced from the central point 103 of assembly 100B by a distance $H_{198'a}$ that is larger than the distance $H_{197'b}$, previously described. Therefore, each contact line 198'a is axially spaced from the contact lines 197'b by an axial distance $H_{198'a-197'b}$ within each pocket 136 of receptacle 146b. In addition, when assembly 100B is placed in the second configuration, each of the second plurality of spherical drive keys 190b engage the inner walls 138 of the pockets 136 within the receptacle 146a at a contact line 198'b, wherein each of the contact lines 198'b is axially spaced from the central point 103 of assembly 100B by a distance $H_{198'b}$ that is smaller than the distance $H_{197'a}$, previously described. Therefore, each contact line 198'b is axially spaced from the contact lines 197'a by an axial distance $H_{198'b-197'a}$ within each pocket 136 of receptacle 146a. To ensure that each of the drive keys 190a, 190b engage a substantially unworn or undeformed surface within the pockets 136 when assembly 100B is placed in the second configuration, the axial distances $H_{198'a-197'b}$, $H_{198'b-197'a}$ are each preferably at least 30% of the axial length (e.g., diameter $D_{190a}$, $D_{190b}$ for spherical drive keys 190a, 190b, respectively) of the drive keys 190a, 190b, respectively, and are more preferably at least 50% of the axial length (e.g., diameters $D_{190a}$, $D_{190b}$) of the drive keys 190a, 190b, respectively. Further, in some embodiments, the distance $H_{197a}$ is substantially equal to the distance $H_{198'a}$ and the distance $H_{197'b}$ is substantially equal to the distance $H_{198'b}$. Thereafter, normal operations may be resumed with each of the keys 190a, 190b engaging with a substantially unworn surface (e.g., on walls 138) within one of the pockets 136 of receptacles 146b, 146a, respectively. Thus, by transitioning the assembly 100B between the first and second configurations as previously described, the contact or engagement positions (e.g., lines 197'a, 197'b, 198'a, 198'b) of each of the keys 190a, 190b are effectively shifted within the receptacles 146a, 146b to allow each of the keys 190a, 190b to once again engage with an unworn surface therein, thereby increasing the usable life of assembly 100B during drilling operations.

While embodiments described herein have included the use of driveshafts (e.g., driveshafts 120, 120') that further include axially oriented cavities (e.g., cavities 121a, 121b) and thrust balls (e.g., thrust balls 122a, 122b) it should be appreciated that other embodiments may include driveshafts having alternative designs while still complying with the principles disclosed herein. For example, referring now to FIGS. 8 and 9, a driveshaft assembly 200A is shown. Assembly 200A is substantially the same as the assembly 100A except that assembly 200A includes a driveshaft 220, a first thrust bearing seat 270, and a second thrust bearing seat 280 in place of the driveshaft 120, seat 170, and seat 180, respectively.

Driveshaft 220 has a central or longitudinal axis 225, a first end 220a, a second end 220b opposite the first end 220a, and a generally cylindrical radially outer surface 220c extending axially between ends 220a, 220b. In addition, driveshaft 220 includes a first plurality of spherical recesses 229a extending circumferentially about driveshaft 220 and radially inward from surface 220c proximate the first end 220a, and a second plurality of spherical recesses 229b extending circumferentially about driveshaft 220 and radially inward from surface 220c proximate the second end 220b. Further, a first convex spherical bearing surface 222a having a center of curvature 223a is disposed at the first end 220a and a second convex spherical bearing surface 222b having a center of curvature 223b is disposed at the second end 220a. During operation, the centers of curvature 223a, 223b each serve as the center of omni-direction pivoting of driveshaft 220 (analogous to the centers 123a, 123b of balls 122a, 122b, previously described) as the housings 130, 140, and driveshaft 220 each rotate about their respective axes 135, 145, 225 as previously described.

The first plurality of spherical drive keys 190a, previously described, is disposed on driveshaft 220 proximate first end 220a such that each one of the first plurality of drive keys 190a is at least partially disposed or seated within one of the first plurality of recesses 229a. In addition, the second plurality of spherical drive keys 190b, previously described, is disposed on driveshaft 220 proximate second end 220b such that each one of the second plurality of drive keys 190b is at least partially disposed or seated within one of the second plurality of recesses 229b. As is best shown in FIG. 8, in this embodiment, the first radial plane 127a (i.e., the plane aligning the centers 193a of keys 190a as previously described) extends perpendicularly through the central axis 225 of driveshaft 220 and the center of curvature 223a while, the second radial plane 127b (i.e., the plane aligning the centers 193a of keys 190a as previously described) extends perpendicularly through the central axis 225 of driveshaft 220 and the center of curvature 223b.

Seat 270 has a central or longitudinal axis 275 and includes a first or outer end 270a, a second or inner end 270b opposite the outer end 270a, a concave spherical bearing surface 272 disposed at the inner end 270b, and a axial central length $L_{270}$ extending between the ends 270a, 270b along axis 275 (i.e., length $L_{270}$ is measured along axis 275 between end 270a and surface 272). Seat 280 has a central or longitudinal axis 285 and includes a first or outer end 280a, a second or inner end 280b opposite the outer end 280a, a concave spherical bearing surface 282 disposed at the inner end 280b, and a axial central length $L_{280}$ extending between the ends 280a, 280b along axis 285 (i.e., length $L_{280}$ is measured along axis 285 between end 280a and surface 282). In this embodiment the length $L_{280}$ is greater than the length $L_{270}$. During operation, each seat 270, 280 is disposed within one of the receptacles 146a, 146b such that the outer ends 270a, 280a are seated within one of the counter bores 149 (see FIG. 5) and each of the surfaces 272, 282 engage with one of the surfaces 222a, 222b, previously described.

Figures 8, 9:
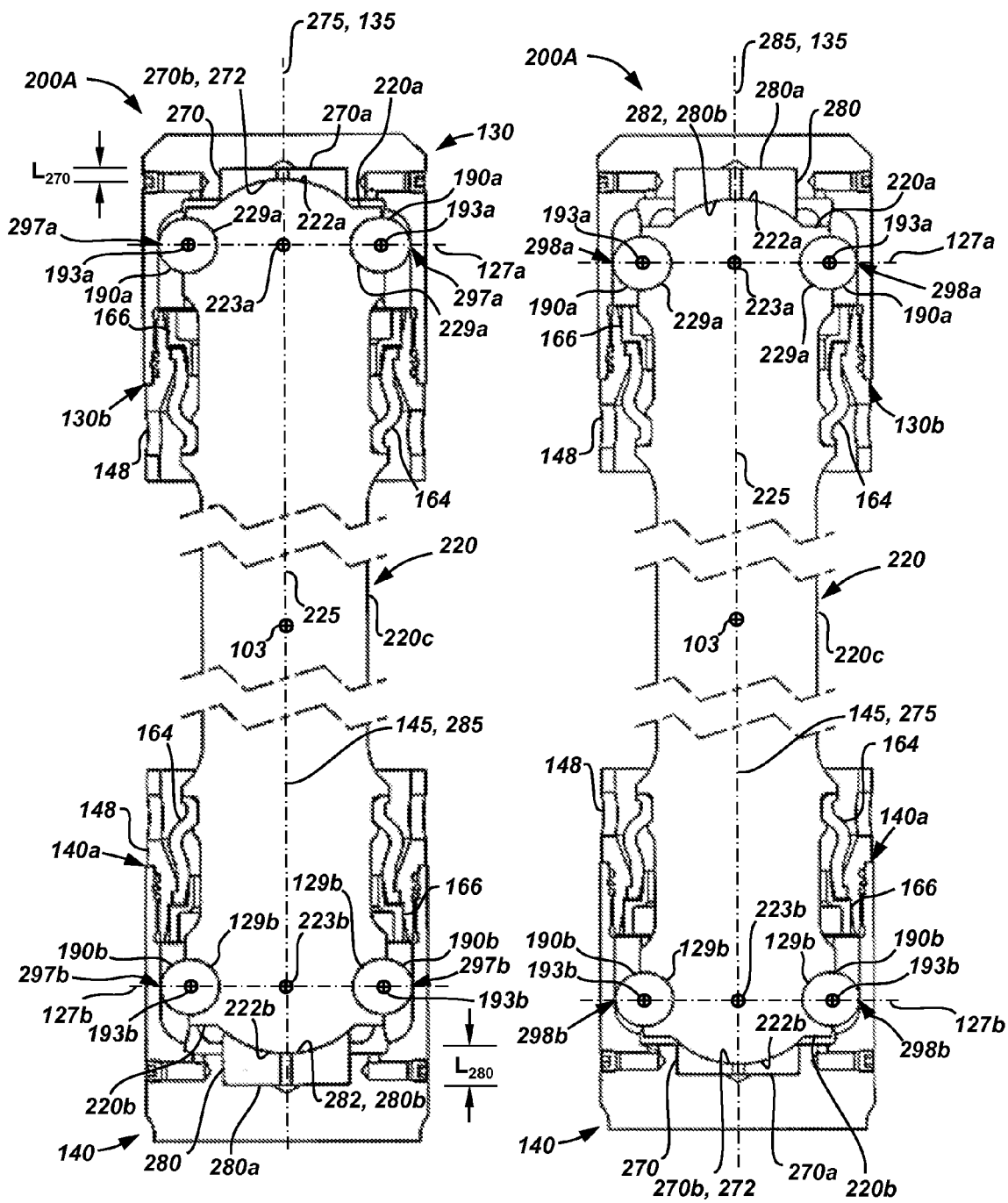
FIG. 8 is a side cross-sectional view of an embodiment of the driveshaft assembly of FIG. 1 in a first configuration.
FIG. 9 is a side cross-sectional view of the driveshaft assembly of FIG. 8 in a second configuration.

Therefore, during operation, assembly 200A may be placed in a first configuration, such as is shown in FIG. 8, in which the first end 220a and bearing seat 270 are received within the receptacle 146a such that the convex spherical bearing surface 222a engages the concave spherical bearing surface 272 of seat 270 and each of the keys 190a engages the inner wall 138 of one of the pockets 136 within receptacle 146a at a contact line 297a. Similarly, in the first configuration shown in FIG. 8, the second end 220b and bearing seat 280 are received within the receptacle 146b such that the convex spherical bearing surface 222b engages the concave spherical bearing surface 282 of seat 280 and each of the keys 190b engages the inner wall 138 of one of the pockets 136 within receptacle 146b at a contact line 297b. As described above for assembly 100A, each of the contact lines 297a are axially spaced at a greater distance from the central point 103 of assembly 200A than each of the contact lines 297b.

During operations, the housing 130, driveshaft 220, and housing 140 each rotate about their respective axes 135, 225, 145, while the driveshaft 220 simultaneously pivots about the centers 223a, 223b of the surfaces 222a, 222b, respectively, in a similar manner to that previously described above for assembly 100A. During this process, the inner walls 138 of the pockets 136 of receptacles 146a, 146b wear and deform due to the contact with the keys 190a, 190b, respectively at and axially proximate lines 297a, 297b, as previously described, such that the torque transfer capabilities of assembly 200A are diminished. Thus, referring specifically to FIG. 9, in at least some embodiments, assembly 200A may be transitioned to a second configuration by switching the relative positions of the first and second thrust bearing seats 270, 280, respectively, within the receptacles 146a, 146b. For the same reasons described above for assembly 100A, because the length $L_{280}$ is larger than the length $L_{270}$, placing the assembly 200A in the second configuration causes the keys 190a to engage the inner wall 138 of one of the pockets 136 of the receptacle 146a at a contact line 298a that is axially spaced from the contact line 297a and causes the keys 190b to engage the inner wall 138 of one of the pockets 136 of the receptacle 146b at a contact line 298b that is axially spaced from the contact line 297b. To ensure that each of the drive keys 190a, 190b engage a substantially unworn or un-deformed surface within the pockets 136 when assembly 200A is placed in the second configuration, the relative axial distance between the lines 297a, 298a and the relative axial distance between the lines 297b, 298b is preferably at least 30% of the axial length (e.g., diameter $D_{190a}$, $D_{190b}$ for spherical drive keys 190a, 190b, respectively) of the drive keys 190a, 190b, respectively, and is more preferably at least 50% of the axial length (e.g., diameters $D_{190a}$, $D_{190b}$) of the drive keys 190a, 190b, respectively. Thereafter, normal operations may be resumed with each of the keys 190a, 190b engaging with a substantially unworn surface (e.g., on walls 138) within one of the pockets 136 of receptacles 146a, 146b, respectively. Thus, by transitioning the assembly 200A between the first and second configurations as previously described, the contact or engagement positions (e.g., lines 297a, 297b, 298a, 298b) of each of the keys 190a, 190b are effectively shifted within the receptacles 146a, 146b to allow each of the keys 190a, 190b to once again engage with an unworn surface therein, thereby increasing the usable life of assembly 200A during drilling operations.

Figure 10:
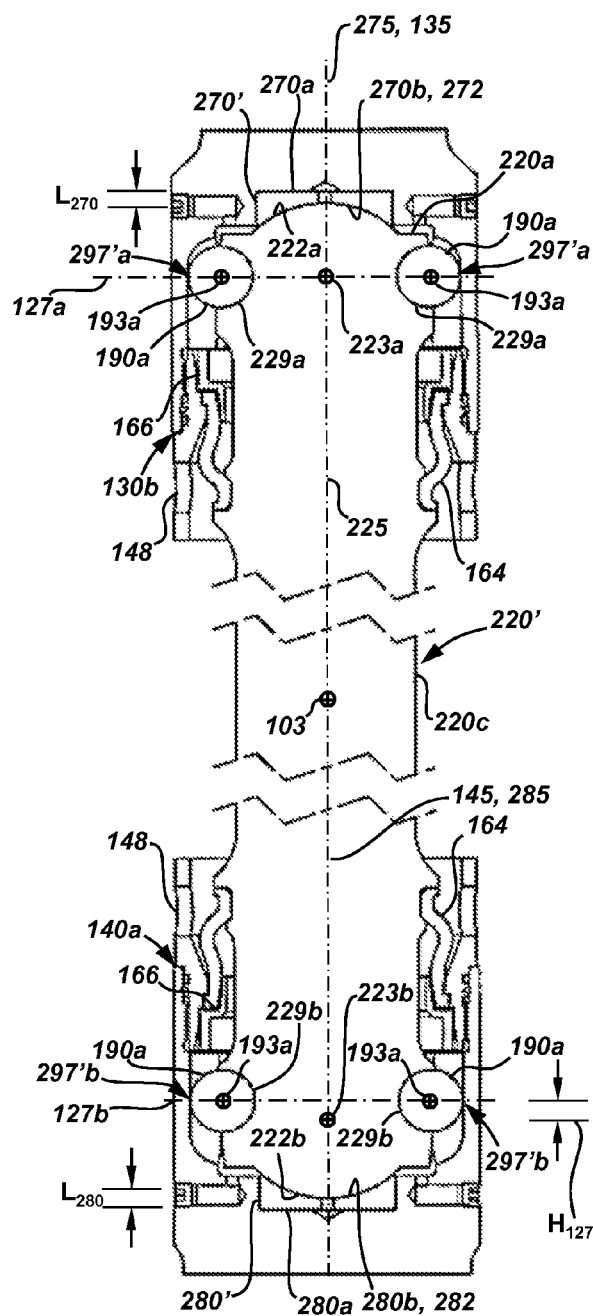
FIG. 10 is a side cross-sectional view of an embodiment of the driveshaft assembly of FIG. 1 in a first configuration.
Figure 11:
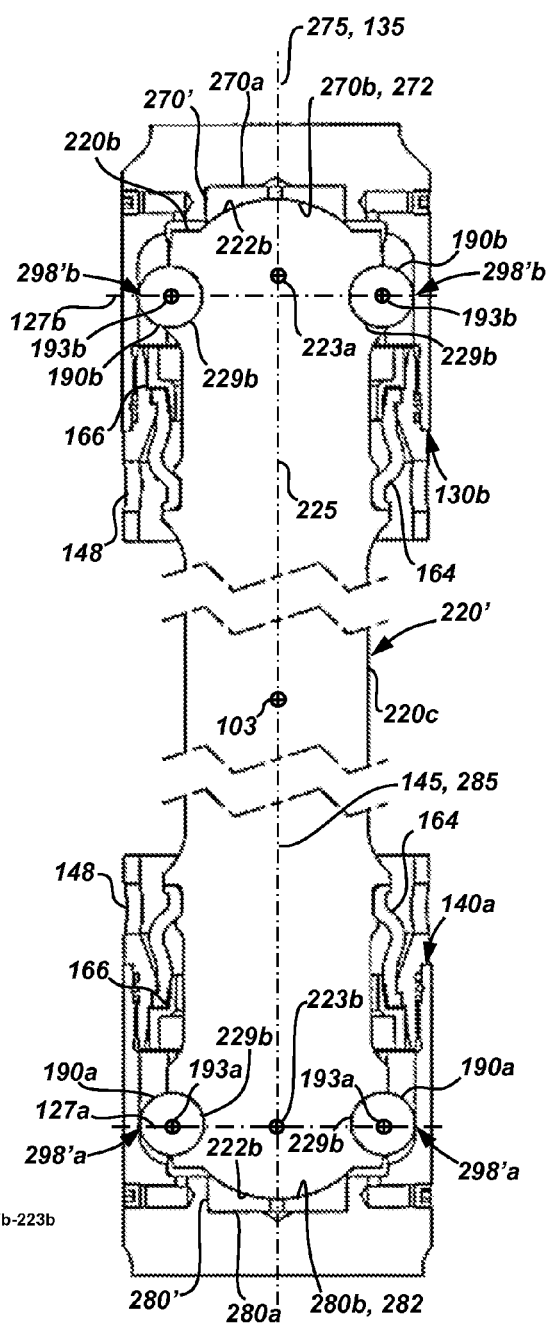
FIG. 11 is a side cross-sectional view of the driveshaft assembly of FIG. 10 in a second configuration.

As another example, referring now to FIGS. 10 and 11, a driveshaft assembly 200B is shown. Assembly 200B includes many of the same features as assembly 200A, previously described. As a result, like components and features are referred to with like reference numerals, and the discussion below will concentrate on the differences between the assemblies 200A, 200B and/or specific components disposed therein. In particular, assembly 200B includes a driveshaft 220' that shares many of the same components and features as the driveshaft 220, previously described, except that the axial position of the recesses 229b is shifted relative to the second end 220b such that when the drive keys 190b are disposed within the recesses 229b, the second radial plane 127b (aligning the centers 193b of keys 190b) is axially spaced from the center of curvature 223b of the surface 222b by an axial distance $H_{127b-223b}$ (i.e., the centers 193b of the keys 193b are axially spaced from the center 223b by the distance $H_{127b-223b}$). However, it should be appreciated that the first radial plane 127a extends perpendicularly with respect to the axis 225 through the centers 193a of keys 190a and the center of curvature 223a in the same manner as previously described for assembly 200A. In addition, assembly 200B includes a first thrust bearing seat 270' and a second thrust bearing seat 280', that are substantially the same as the first and second bearing seats 270, 280, respectively, except that the central length $L_{270}$ of the seat 270' is substantially equal to the central length $L_{280}$ of the seat 280'.

Therefore, during operation, assembly 200B may be placed in a first configuration, such as is shown in FIG. 10, in which the first end 220a is received within the receptacle 146a such that the convex spherical bearing surface 222a engages the concave spherical bearing surface 272 of seat 270' and each of the keys 190a engages the inner wall 138 of one of the pockets 136 within receptacle 146a at a contact line 297'a. Similarly, in the first configuration shown in FIG. 10, the second end 220b is received within the receptacle 146b such that the convex spherical bearing surface 222b engages the concave spherical bearing surface 282 of seat 280' and each of the keys 190b engages the inner wall 138 of one of the pockets 136 within receptacle 146b at a contact line 297'b. As described above for assembly 100B, each of the contact lines 297'a are axially spaced at a greater distance from the central point 103 of assembly 200B than each of the contact lines 297'b.

During operations, the housing 130, driveshaft 220', and housing 140 each rotate about their respective axes 135, 225, 145, while the driveshaft 220' simultaneously pivots about the centers 223a, 223b of the surfaces 222a, 222b, respectively, as previously described. During this process, the inner walls 138 of the pockets 136 of receptacles 146a, 146b wear and deform due to the contact with the keys 190a, 190b, respectively, at and axially proximate lines 297'a, 297'b, as previously described, such that the torque transfer capabilities of assembly 200B are diminished. Thus, referring specifically to FIG. 11, in at least some embodiments, assembly 200B may be transitioned to a second configuration by inverting the driveshaft 220' relative to the housings 130, 140 such that end 220a is received within the receptacle 146b and end 220b is received within the receptacle 146a. For the same reasons described above for assembly 100B, because plane 127a passes through the center 223a at the first end 220a of driveshaft 220' and plane 127b is axially spaced from center 223b at the second end 220b, placing assembly 200B in the second configuration causes the keys 190b to engage the inner wall 138 of one of the pockets 136 of the receptacle 146a at a contact line 298'b that is axially spaced from the contact line 297'a and causes the keys 190a to engage the inner wall 138 of one of the pockets 136 of the receptacle 146b at a contact line 298'a that is axially spaced from the contact line 297'b. To ensure that each of the drive keys 190a, 190b engage a substantially unworn or un-deformed surface within the pockets 136 when assembly 200B is placed in the second configuration, the relative axial distance between the lines 297'a, 298'b and the relative axial spacing between the lines 297'b, 298'a is preferably at least 30% of the axial length (e.g., diameter $D_{190a}$, $D_{190b}$ for spherical drive keys 190a, 190b, respectively) of the drive keys 190a, 190b, respectively, and is more preferably at least 50% of the axial length (e.g., diameters $D_{190a}$, $D_{190b}$) of the drive keys 190a, 190b, respectively. Thereafter, normal operations may be resumed with each of the keys 190*a*, 190*b* engaging with a substantially unworn surface (e.g., on walls 138) within one of the pockets 136 of receptacles 146*b*, 146*a*, respectively Thus, by transitioning the assembly 200B between the first and second configurations as previously described, the contact or engagement positions (e.g., lines 297'*a*, 297'*b*, 298'*a*, 298'*b*) of each of the keys 190*a*, 190*b* are effectively shifted within the receptacles 146*a*, 146*b* to allow each of the keys 190*a*, 190*b* to once again engage with an unworn surface therein, thereby increasing the usable life of assembly 200A during drilling operations.

In the manner described, through use of a driveshaft assembly (e.g., assemblies 100A, 100B, 200A, 200B) in accordance with the principles disclosed herein an operator may place the driveshaft assembly in multiple configurations to lengthen the overall useful life of the assembly, which thereby decreases the costs of performing drilling operations. While embodiments disclosed herein have included spherical drive keys 190*a*, 190*b* and spherical recesses 129*a*, 129*b*, 229*a*, 229*b*, it should be appreciated that in other embodiments the drive keys 190*a*, 190*b* and recesses 129*a*, 129*b*, 229*a*, 229*b*, may be formed in a wide variety of shapes while still complying with the principles disclosed herein. In addition, while the engagement between the keys 190*a*, 190*b* and the walls 138 of pockets has been described as line contact, it should be appreciated that in other embodiments, other contact types are possible such as, for example, point contact. Further, while the embodiments described herein have included a plurality of drive keys 190*a*, 190*b* and a plurality of pockets 136, it should be appreciated that the number and arrangement of the keys 190*a*, 190*b* and pockets 136 may be varied greatly while still complying with the principles disclosed herein. For example, in some embodiments, there may be only one key (e.g., key 190*a*, 190*b*) that engages with one pocket (e.g., pocket 136) within each housing 130, 140. Still further, while embodiments disclosed herein have shown and described assembly 100 as operating within a straight housing 110, it should be appreciated that in other embodiments, assembly 100 may be disposed within other types of housings (e.g., bent or adjustable) while still complying with the principles disclosed herein.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A driveshaft assembly for a downhole motor, the driveshaft assembly comprising:
   a driveshaft having a central longitudinal axis, a first end, a second end opposite the first end, a first recess proximate the first end, and a second recess proximate the second end;
   a first drive key configured to be at least partially disposed within the first recess;
   a second drive key configured to be at least partially disposed within the second recess;
   a first end housing having a central axis, a first end, a second end opposite the first end, and a first receptacle extending axially from an open end to a closed end, wherein the open end is proximate the first end of the first end housing and wherein the first receptacle includes a first pocket having an inner wall; and
   a second end housing having a central axis, a first end, a second end opposite the first end, and a second receptacle extending axially from an open end to a closed end, wherein the open end is proximate the first end of the second end housing and wherein the second receptacle includes a second pocket having an inner wall;
   a central point disposed along the central longitudinal axis of the driveshaft and substantially equidistant from the closed end of the first receptacle and the closed end of the second receptacle along the central longitudinal axis of the driveshaft;
   a first thrust bearing seat having a central axis, a first end, a second end opposite the first end, and a first central length L1 measured axially along the central axis of the first thrust bearing seat from the first end of the first thrust bearing seat to the second end of the first thrust bearing seat; and
   a second thrust bearing seat having a central axis, a first end, a second end opposite the first end, and a second central length L2 measured axially along the central axis of the second thrust bearing seat from the first end of the second thrust bearing seat to the second end of the second thrust bearing seat;
   wherein L1 and L2 are both fixed and wherein L2 is greater than L1;
   wherein the driveshaft assembly has a first configuration, wherein:
      the first end of the driveshaft is disposed within the first receptacle such that the first drive key engages the inner wall of the first pocket at a first contact point that is spaced from the central point at a distance H1 along the central longitudinal axis of the driveshaft
      the second end of the driveshaft is disposed within the second receptacle such that the second drive key engages the inner wall of the second pocket at a second contact point that is spaced from the central point at a distance H2 along the central longitudinal axis of the driveshaft, wherein H1 is greater than H2;
      the first thrust bearing seat is disposed within the first receptacle such that the central axis of the first thrust bearing seat is coaxially aligned with the central axis of the first end housing; and
      the second thrust bearing seat is disposed within the second receptacle such that the central axis of the second thrust bearing seat is coaxially aligned with the central axis of the second end housing.

2. The driveshaft of claim 1, wherein the driveshaft assembly has a second configuration, wherein the first end of the driveshaft is disposed within the first receptacle such that the first drive key engages the inner wall of the first pocket at a third contact point that is spaced from the central point at a distance H3 along the central longitudinal axis of the driveshaft, and wherein the second end of the driveshaft is disposed within the second receptacle such that the second drive key engages the inner wall of the second pocket at a fourth contact point that is spaced from the central point at a distance H4 along the central longitudinal axis of the driveshaft; and wherein H4 is greater than H3.

3. The driveshaft assembly of claim 2, wherein H3 is substantially equal to H2 and wherein H4 is substantially equal to H1.

4. The driveshaft assembly of claim 2, wherein the first drive key is a spherical and has a diameter; and wherein the difference between H1 and H3 is at least 30% of a diameter of the first drive key.

5. The driveshaft assembly of claim 2, wherein no additional components are added or substituted within the driveshaft assembly to transition the driveshaft assembly from the first configuration to the second configuration.

6. The driveshaft assembly of claim 2, wherein the first thrust bearing seat further comprises a first concave, spherical bearing surface disposed on the first end of the first thrust bearing seat, wherein the first central length L1 is measured axially along the central axis of the first thrust bearing seat between the second end of the first thrust bearing seat and the first concave, spherical bearing surface;

wherein the second thrust bearing seat further comprises
a second concave, spherical bearing surface disposed on the first end of the second thrust bearing seat, wherein the second central length L2 is measured axially along the central axis of the second thrust bearing seat between the second end of the second thrust bearing seat and the second concave, spherical bearing surface.

7. The driveshaft assembly of claim 2, wherein when the driveshaft assembly is in the second configuration, the first thrust bearing seat is disposed within the second receptacle such that the central axis of the first thrust bearing seat is coaxially aligned with the central axis of the second end housing, and the second thrust bearing seat is disposed within the first receptacle such that the central axis of the second thrust bearing seat is coaxially aligned with the central axis of the first end housing.

8. The driveshaft assembly of claim 1, wherein the driveshaft further includes:

a first pivot point disposed along the central, longitudinal axis of the driveshaft and proximate the first end of the driveshaft;

a second pivot point disposed along the central, longitudinal axis of the driveshaft and proximate the second end of the driveshaft;

a first convex spherical bearing surface on the first end having a first center of curvature; and a second convex spherical bearing surface on the second end having a second center of curvature;

wherein the first pivot point is positioned at the first center of curvature and the second pivot point is positioned at the second center of curvature.

9. The driveshaft assembly of claim 1, wherein the driveshaft further includes:

a first pivot point disposed along the central, longitudinal axis of the driveshaft and proximate the first end of the driveshaft;

a second pivot point disposed along the central, longitudinal axis of the driveshaft and proximate the second end of the driveshaft;

a third recess extending axially from the first end of the driveshaft; and a fourth recess extending axially from the second end of the driveshaft;

wherein the driveshaft assembly further comprises:
a first thrust ball having a center and configured to be disposed within either the third recess or the fourth recess; and a second thrust ball having a center and configured to be disposed within either the third recess or the fourth recess;

wherein when the first thrust ball is disposed within the third recess, the center of the first thrust ball is positioned at the first pivot point; and wherein when the second thrust ball is disposed within the fourth recess, the center of the second thrust ball is positioned at the second pivot point.

10. A driveshaft assembly, comprising:

a driveshaft having a central longitudinal axis, a first end, a second end opposite the first end, a first recess proximate the first end, and a second recess proximate the second end;

a first drive key configured to be at least partially disposed within the first recess;

a second drive key configured to be at least partially disposed within the second recess;

a first end housing having a central axis, a first end, a second end opposite the first end, and a first receptacle extending axially from the first end, wherein the first receptacle includes a first pocket having an inner wall; and a second end housing having a central axis, a first end, a second end opposite the first end, and a second receptacle extending axially from the first end, wherein the second receptacle includes a second pocket having an inner wall;

a first thrust bearing seat disposed within the first receptacle and including a central axis that is substantially aligned with the central axis of the first end housing, a first end, a second end opposite the first end, a first concave, spherical bearing surface disposed on the first end, and a first central length L1 measured axially along the central axis of the first thrust bearing seat between the second end and the first concave, spherical bearing surface; and a second thrust bearing seat disposed within the second receptacle and including a central axis that is substantially aligned with the central axis of the second end housing, a first end, a second end opposite the first end, a second concave, spherical bearing surface disposed on the first end, and a second central length L2 measured axially along the central axis of the second thrust bearing seat between the second end and the second concave, spherical bearing surface;

wherein L1 and L2 are both fixed and wherein L2 is greater than L1.

11. The driveshaft assembly of claim 10, wherein the first drive key and the second drive key are each spherical such that each has a diameter; and wherein the difference between L1 and L2 is at least 30% of the diameter of the first drive key and the second drive key.

12. A method for drilling a borehole into an earthen formation, the method comprising:

(a) contacting a first end housing at a first axial position with a first drive key, wherein the first end housing has a central axis, a first end, a second end opposite the first end, and a first receptacle extending axially from the first end, wherein the first receptacle includes a first pocket having an inner wall, and wherein the first drive key is disposed within the first receptacle in the first end housing and radially disposed between the first end housing and a driveshaft;

(b) contacting a second end housing at a second axial position with a second drive key, wherein the second end housing has a central axis, a first end, a second end opposite the first end, and a second receptacle extending axially from the first end, wherein the second receptacle includes a second pocket having an inner wall, and wherein the second drive key is disposed within the second receptacle in the second end housing and radially disposed between the second end housing and a driveshaft;

wherein driveshaft has a central longitudinal axis, a first end, a second end opposite the first end, a first recess proximate the first end, and a second recess proximate the second end;

wherein the first drive key configured to be at least partially disposed within the first recess, wherein the second drive key configured to be at least partially disposed within the second recess;

(c) installing a first thrust bearing seat within the first receptacle before (b), the first thrust bearing seat including a central axis that is substantially aligned with the central axis of the first end housing, a first end, a second end opposite the first end, a first concave, spherical bearing surface disposed on the first end, and a first central length L1 measured axially along the central axis of the first thrust bearing seat between the second end and the first concave, spherical bearing surface;

(d) installing a second thrust bearing seat within the second receptacle before (b), the second thrust bearing seat including a central axis that is substantially aligned with the central axis of the second end housing, a first end, a second end opposite the first end, a second concave, spherical bearing surface disposed on the first end, and a first central length L2 measured axially along the central axis of the second thrust bearing seat between the second end and the second concave, spherical bearing surface, wherein L1 and L2 are both fixed and wherein L2 is greater than L1;

(e) transferring torque between the first end housing and the driveshaft via the first drive key during (a); and (f) contacting the first end housing at a second axial position with the first drive key or a second drive key after (b), wherein the second axial position is axially spaced from the first axial position.

13. The method of claim 12, wherein the first drive key is spherical and has a diameter; and wherein the second axial position is axially spaced from the first axial position by a distance that is at least 30% of the diameter of the first drive key.

14. The method of claim 12, wherein (a) further comprises:

(a1) inserting the first end of the driveshaft into the first receptacle, wherein the first end of the driveshaft includes a first pivot point; wherein the first pivot point is disposed along the central longitudinal axis of the driveshaft; and wherein the driveshaft is configured to pivot omni-directionally about the first pivot point relative to the first end housing;

(a2) partially inserting the first drive key within the first recess such that a center of the first drive key lies within a first plane that extends radially through the central axis of the driveshaft and passes through the first pivot point.

* * * * *